Patented Oct. 9, 1928.

1,686,582

UNITED STATES PATENT OFFICE.

HUGO STOLTZENBERG, OF HAMBURG, GERMANY.

PROCESS FOR DESTROYING CACTI.

No Drawing.  Application filed October 20, 1925. Serial No. 63,768.

The various cacti specially the *Opuntia inermis* and other species of the genus Opuntia have reached the dimensions of a plague in Australia and have also spread alarmingly in recent years in South Africa and in the southern part of the United States. Arsenic compounds have previously been shown to be the best means for destroying the cacti, being partly injected, partly sprayed and partly used in the form of vapour. Injected agents are, in ascending order of effectiveness:—Sodium arsenite, arsenic trichloride, arsenic acid dissolved in water and arsenic acid dissolved in sulphuric acid (Robert's poison). Only arsenic trichloride and arsenic acid in solution in sulphuric acid are to be considered for spraying purposes, and arsenic trichloride alone is used in the form of vapour for destroying cacti.

It has been found that organic arsenical compounds particularly aromatic organic arsenical compounds are to be regarded as the best agents for destroying cacti, more especially the aryl compounds of tri- and penta-valent arsenic and arsenical compounds combined with heterocyclic rings, which possess these properties of tri- and penta-valent inorganic arsenical compounds noxious to the cacti-cells to a higher degree, inasmuch as they enter more easily into the cells of the cacti, mingle with the flow of sap and consequently poison the cacti as far as the roots in the shortest space of time. This means is also especially practicable in that not only inorganic solvents, but also organic solvents which can only affect the outer skin of the cactus, for instance, cresol, have the destructive effect on the cacti when used as solvent. As the new means is extraordinarily more virulent against the cacti cells than the inorganic agents, the compounds may be used in much lower concentration than the inorganic compounds. Consequently, not only are the cacti destroyed much more quickly, thoroughly, and also cheaply than by inorganic compounds, but in addition the effect of the arsenic on the earth is much less, as the concentration of the arsenic left in the plant or the earth is appreciably lower as the organic complex is broken up by bacteria in the soil.

The following may be cited as the most important arsenic compounds of use in destroying cacti: mono- and diphenyl arsine chloride and the corresponding cyanide; and also mono- and di- phenyl arsine oxide; and by way of example of arsenical compounds containing heterocyclic rings, phenarsazin-chloride and its corresponding derivatives. Di-phenyl arsine oxide is considered the most important of these. It is immaterial in which of the above-mentioned solvents these compounds are dissolved and used. A 5% solution of these compounds in arsenious chloride or concentrated sulphuric acid is recommended for the expert and a solution of similar concentration in cresol, as the cheapest organic solvent, for lay use. The above-mentioned compounds can be used not only as injections and sprays but also in the vaporized condition when they have a more powerful action than arsenious chloride, as they do not have the property of producing a cork-like protective layer on the parts of the cactus which are not directly fatally affected, as the cactus offers no protection against penetration of organic arsenical compounds.

*Example 1.*—A 5% solution of di-phenyl arsine oxide in concentrated sulphuric acid (66° Baumé) is injected into the cactus plants in small quantities and after one day the cactus has already shrunk to a loose skin.

*Example 2.*—A 5% solution of di-phenyl arsine oxide in concentrated sulphuric acid (66° Baumé) is sprayed over the cacti from a spraying apparatus (atomizer). The cacti have shrunk up after one day.

*Example 3.*—A 5% solution of di-phenyl arsine oxide in concentrated sulphuric acid (66° Baumé) is sprayed on to and over the cacti by means of an aeroplane, with the same effect.

*Example 4.*—A fumigator with a fumigatory layer of di-phenyl arsine oxide is directed against the cacti in a moderate wind. The cacti affected by the vapour shrink up after one or a few days according to the concentration.

What I claim is:—

1. The process of destroying cacti, which consists in subjecting such cacti to the toxic action of aromatic arsenic compounds.

2. The process of destroying cacti, which consists in subjecting such cacti to the action of a solution of aromatic arsenic compounds.

In testimony whereof I affix my signature.

HUGO STOLTZENBERG.